(12) United States Patent
Mastroianni

(10) Patent No.: US 10,364,309 B2
(45) Date of Patent: Jul. 30, 2019

(54) SUPPORTED POLYMERISATION CATALYSTS

(71) Applicant: INEOS SALES (UK) LIMITED, Lyndhurst, Hampshire (GB)

(72) Inventor: Sergio Mastroianni, Etterbeek (BE)

(73) Assignee: INEOS SALES (UK) LIMITED, Hampshire (GB)

( * ) Notice: Subject to any disclaimer, the term of this patent is extended or adjusted under 35 U.S.C. 154(b) by 254 days.

(21) Appl. No.: 15/364,757

(22) Filed: Nov. 30, 2016

(65) Prior Publication Data

US 2017/0081446 A1 Mar. 23, 2017

Related U.S. Application Data

(63) Continuation of application No. 11/921,270, filed as application No. PCT/GB2006/002005 on Jun. 1, 2006, now abandoned.

(30) Foreign Application Priority Data

Jun. 9, 2005 (EP) .................................... 05253565

(51) Int. Cl.
*C08F 4/64* (2006.01)
*C08F 4/76* (2006.01)
*C08F 210/16* (2006.01)
*C08F 10/00* (2006.01)
*C08F 4/659* (2006.01)
*C08F 4/6592* (2006.01)

(52) U.S. Cl.
CPC ............ *C08F 210/16* (2013.01); *C08F 10/00* (2013.01); *C08F 4/6592* (2013.01); *C08F 4/65908* (2013.01); *C08F 4/65912* (2013.01)

(58) Field of Classification Search
CPC ....................................................... C08F 4/76
See application file for complete search history.

(56) References Cited

U.S. PATENT DOCUMENTS

| 4,374,753 A * | 2/1983 | Pullukat .................. C08F 10/00 502/111 |
| 6,171,993 B1 * | 1/2001 | Mavridis .............. B01J 31/0274 502/103 |
| 6,417,130 B1 * | 7/2002 | Mink ...................... C08F 10/00 502/113 |
| 6,812,303 B1 * | 11/2004 | Matsushita ........... C08F 210/16 502/120 |

FOREIGN PATENT DOCUMENTS

| WO | WO 2004/055062 A1 | 7/2004 |
| WO | WO 2005/019275 A1 | 3/2005 |

OTHER PUBLICATIONS

PCT/IB/326, Notification Concerning Transmittal of International Preliminary Report on Patentability; PCT/GB2006/002005, Int'l Filing dated Jun. 1, 2006.

* cited by examiner

*Primary Examiner* — Rip A Lee
(74) *Attorney, Agent, or Firm* — Nixon & Vanderhye P.C.

(57) ABSTRACT

A supported polymerisation catalyst system comprises: (a) a polymerisation catalyst, (b) a cocatalyst, and (c) a porous support, and is characterised in that the porous support has been pretreated with (i) a chemical dehydration agent and (ii) a hydroxy compound wherein the hydroxy compound is not a cocatalyst or component thereof. The preferred polymerisation catalyst is a transition metal compound for example a metallocene and by use of the supported catalyst systems improved activity may be achieved.

16 Claims, No Drawings

SUPPORTED POLYMERISATION CATALYSTS

This application is a continuation of Application No. 11/921,270 filed Nov. 29, 2007, now abandoned, which is a 371 of PCT/GB2006/002005 filed Jun. 1, 2006, which claims priority to European Patent Application No. 05253565.5 filed Jun. 9, 2005, the entire contents of each of which are hereby incorporated by reference.

The present invention relates to supported catalysts suitable for the polymerisation of olefins and in particular to the preparation of supported polymerisation catalysts in particular mctalloceue catalysts providing advantages for operation in for example gas phase processes for the polymerisation of ethylene or the copolymerisatioa of ethylene and α-olefins having from 3 to 10 carbon atoms.

In recent years there have been many advances in the production of polyolefin homopolymers and copolymers due to the introduction of metallocene catalysts. Metallocene catalysts offer the advantage of generally a higher activity that traditional Ziegler catalysts and are usually described as catalysts which are single site in nature. There have been developed several different families of metallocene complexes. In earlier years catalysts based on bis (cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the bis (cyclopentadienyl) and mono (cyclopentadienyl) complexes have been described in WO 96/04290 and WO 95/00526 respectively.

The above metallocene complexes are utilised for polymerisation in the presence of a cocatalyst or activator. Typically activators are aluminoxanes, in particular methyl aluminoxane or alternatively may be compounds based on boron compounds. Examples of the latter are borates such as trialkyl-substituted ammonium tetraphenyl- or tetrafluorophenyl-borates or triarylboranes such as tris(pentafluorophenyl) borane. Catalyst systems incorporating borate activators are described in EP 561479, EP 418044 and EP 551277.

The above metallocene complexes may be used for the polymerisation of olefins in solution, slurry or gas phase. When used in the slurry or gas phase the metallocene complex and/or the activator are suitably supported. Typical supports include inorganic oxides eg. silica or polymeric supports may alternatively be used.

Examples of the preparation of supported metallocene catalysts for the polymerisation of olefins may be found in WO 94/26793, WO 95/07939, WO 96/00245, WO 96/04318, WO 97/02297 and EP 642536.

The support material may be subjected to a heat treatment and/or chemical treatment to reduce the water content or the hydroxyl content of the support material. Typically chemical dehydration agents are reactive metal hydrides, aluminium alkyls and halides.

Support materials may also be treated with organic compounds in order to improve the particle distribution of the resultant polymerisation catalysts. For example U.S. Pat. No. 6,100,213 describes silica which is treated sequentially with an aluminoxane as cocatalyst and an electron attractive group such as a phenol.

We have now surprisingly found that by pretreatment of the porous support with a chemical dehydration agent and a hydroxy compound leads to an improved activity of the resultant supported catalyst system.

By pretreatment is meant the support material is treated with the aforementioned compounds before impregnation of the other catalyst components ie. polymerisation catalyst and cocatalyst.

Thus according to the present invention there is provided a supported polymerisation catalyst system comprising
(a) a polymerisation catalyst,
(b) a cocatalyst, and
(c) a porous support, characterised in that the porous support has been pretreated with (i) a chemical dehydration agent and (ii) a hydroxy compound wherein the hydroxy compound is not a cocatalyst or component thereof.

The preferred molar ratio of hydroxy compound to chemical dehydration agent is <2 and preferably in the range 0.001 to 0.2.

Suitable porous support materials include inorganic metal oxides or alternatively polymeric supports may be used for example polyethylene, polypropylene, clays, zeolites, etc.

Suitable inorganic metal oxides are $SiO_2$, $Al_2O_3$, MgO, $ZrO_2$, $TiO_2$, $B_2O_3$, CaO, ZnO and mixtures thereof.

The most preferred support material for use with the supported catalysts according to the method of the present invention is silica. Suitable silicas include Ineos ES70 and Grace Davison 948 silicas.

Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

Preferred trialkylaluminium compounds are triethylaluminium or triisobutylaluminium.

The support material is pretreated with the organometallic compound at a temperature of −20° C. to 150° C. and preferably at 20° C. to 100° C.

Other suitable supports may be those described in our application WO 04/055062.

Preferred hydroxy compounds are alcohols for example ethanol. Most preferred hydroxy compounds are long chain alcohols.

A particularly preferred alcohol is 10-undecen-1-ol.

The polymerisation catalyst according to the present invention may suitably be any polymerisation catalyst used in conjunction with a porous support in the present of a suitable cocatalyst.

The-polymerisation catalyst may typically be a transition metal compound of Groups IIIA to IIB of the Periodic Table of Elements (IUPAC Version). Examples of such transition metal compounds are traditional Ziegler Natta, vanadium and Phillips-type catalysts well known in the art.

The traditional Ziegler Natta catalysts include transition metal compounds from Groups IVA-VIA, in particular catalysts based on titanium compounds of formula MRx where M is titanium and R is halogen or a hydrocarbyloxy group and x is the oxidation state of the metal. Such conventional type catalysts include $TiCl_4$, $TiBr_4$, $Ti(OEt)_3Cl$, $Ti(OEt)_2Br_2$ and similar. Traditional Ziegler Natta catalysts are described in more detail in "Ziegler-Natta Catalysts and Polymerisation" by J. Boor, Academic Press, New York, 1979.

Vanadium based catalysts include vanadyl halides eg. VCl$_4$, and alkoxy halides and alkoxides such as VOCl$_3$, VOCl$_2$(OBu), VCl$_3$(OBu) and similar.

Conventional chromium catalyst compounds referred to as Phillips type catalysts include CrO$_3$, chromocene, silyl chroraate and similar and are described in U.S. Pat. Nos. 4,124,532, 4,302,565.

Other conventional transition metal compounds are those based on magnesium/titanium electron donor complexes described for example in U.S. Pat. No. 4,302,565.

Other suitable transition metal compounds are those based on the late transition metals (LTM) of Group VIII for example compounds containing iron, nickel, manganese, ruthenium, cobalt or palladium metals. Examples of such compounds are described in WO 98/27124 and WO 99/12981 and may be illustrated by [2,6-diacetylpyridinebis (2,6-diisopropylanil)FeCl$_2$], 2,6-diacetylpyridinebis (2,4,6-trimethylanil)FeCl$_2$ and [2,6-diacetylpyridinebis(2,6-diisopropylanil)CoCl$_2$].

Other catalysts Include derivatives of Group IIIA, IVA or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group IVB of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1,471-480 (1995).

The preferred polymerisation catalyst of the present invention is a bulky ligand compound also referred to as a metallocene complex containing at least one of the aforementioned delocalized π-bonded group, in particular cyclopentadienyl ligands. Such metallocene complexes are those based on Group IVA metals for example titanium, zirconium and hafnium.

Suitable metallocene complexes are preferably those based on Group IVA metals for example titanium, zirconium and hafnium.

Metallocene complexes may be represented by the general formula:

L$_x$MQ$_n$ where L is a cyclopentadienyl ligand, M is a Group IVA metal, Q is a leaving group and x and n are dependent upon the oxidation state of the metal.

Typically the Group IVA metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl) zirconium dichloride, bis(pentamethyl)cyclopentadienyl dichloride, or may be bridged eg. ethylene bis(indenyl) zirconium dichloride or dimethylsilyl(indenyl) zirconium dichloride.

Other suitable bis(cyclopentadienyl) mesallocene complexes are those bis(cyclopentadienyl) diene complexes described in WO 96/04290. Examples of such complexes are bis(cyclopentadienyl) zirconium (2,3-dimethyl-1,3-butadiene) and ethylene bis(indenyl) zirconium 1,4-diphenyl butadiene.

Examples of monocyclopentadienyl or substituted monocyclopentadienyl metallocene complexes suitable for use in the present invention are described in EP 416815, HP 418044, EP 420436 and EP 551277. Suitable complexes may be represented by the general formula:

CpMX$_n$ wherein Cp is a single cyclopentadienyl or substituted cyclopentadienyl group optionally covalently bonded to M through a substituent, M is a Group VIA metal bound in a η$^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

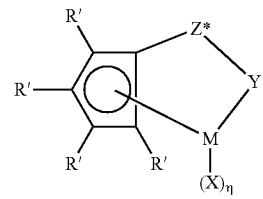

wherein:

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent position of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system., and n is 1 or 2 depending on the valence of M.

Examples of suitable monocyclopentadienyl complexes are (tert-butylamido) dimethyl (tetramethyl-η$^5$-cyclopentadienyl) silanetitanium dichloride and (2-methoxyphenylamido) dimethyl (tetramethyl-η$_5$-cyclopentadienyl) silanetitanium dichloride.

Other suitable monocyclopcntadienyl metallocene complexes are those comprising phosphinimine ligands described in WO 99/40125, WO 00/05237, WO 00/05238 and WO00/32653. A typical examples of such a complex is cyclopentadienyl titanium [tri (tertiary butyl) phosphiniminc] dichloride.

Particularly preferred metallocene complexes for use in the preparation of the supported catalysts of the present invention may be represented by the general formula:

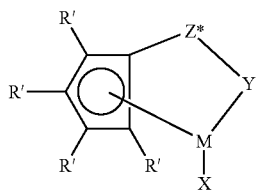

wherein:

R' each occurrence is independently selected from hydrogen, hydrocarbyl, silyl, germyl, halo, cyano, and combinations thereof said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral η$^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system., Examples of suitable X groups include s-trans-η$^4$-1,4-diphenyl-1,3-butadiene, s-trans-η$^4$-3-methyl-1,3-pentadiene; s-trans-η$^4$-2,4-hexadicne; s-trans-n$^4$-1,3-pentadienc; s-trans-η$^4$-1,4-ditolyl-1,3-butadiene; s-trans-η$^4$-1,4-bis (trimethylsilyl)-1,3-butadiene; s-cis-η$^4$-3-methyl-1,3-pentadiene; s-cis-n$^4$-1,4-dibenzyl-1,3-butadiene; s-cis-n$^4$-1,3-pentadiene; s-cis-η$^4$-1,4-bis(trimetliylsilyl)-1,3-butadiene, said s-cis diene group forming a π-complex as defined herein with the metal.

Most preferably R' is hydrogen, methyl, ethyl, propyl, butyl, pentyl, hexyl, benzyl or phenyl or 2 R' groups (except hydrogen) are linked together, the entire C$_5$R'$_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is C$_{1-10}$ hydrocarbyl.

Most preferred complexes are amidosilane—or amidoaikanediyl complexes.

Most preferred complexes are those wherein M is titanium.

Specific complexes suitable for use in the supported polymerisation catalyst systems of the present invention are those disclosed in WO 95/00526 and are incorporated herein by reference.

A particularly preferred complex is (t-butylamido) (tetramethyl-η$^5$-cyclopentadienyl) dimethyl silanethanium-η$^4$-pentadiene.

Suitable cocatalysts for use in the present invention are those typically used with the aforementioned polymerisation catalysts.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Alummoxanes may be prepared in a number of ways and preferably are prepared by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluoropbenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

(L*-H)$^+_d$(A$^{d-}$)

wherein

L* is a neutral Lewis base (L*-H)$^+_d$ is a Bronsted acid

A$^{d-}$ is a non-coordinating compatible anion having a charge of d$^-$, and d is an integer from 1 to 3.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate, N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate.

A preferred type of cocatalyst suitable for use with the metallocene complexes of the present invention comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl) borate
tri (p-tolyl)(hydroxyphenyl) borate
tris(pentafluorophenyl)(hydroxyphenyl) borate
tris(pentafluorophenyl)(4-hydroxyphenyl) borate Examples of suitable cations for this type of cocatalyst include
triethylammonium, triisopropylammonium, diethylmethylammonium, dibutyiethylammonium and similar.

Particularly suitable are those cations having longer alkyl chains such as dihexyldecylmethylammonium, dioctadecylmethylammonium, ditetradecylmethylammonium, bis(hydrogenated tallow alkyl) methylammonium and similar.

Particular preferred cocatalysts of this type are alkylammonium tris(pentafluorophenyl) 4-(hydroxyphenyl) borates. A particularly preferred cocatalyst is bis(hydrogenated tallow alkyl) methyl ammonium tris (pentafluorophenyl) (4-hydroxyphenyl) borate.

With respect to this type of cocatalyst, a preferred compound is the reaction product of an alkylammonium tris (pentaflurophenyl)-4-(hydroxyphenyl) borate and an organometallic compound, for example triethylaluminium or an aluminoxane.

The supported polymerisation catalyst systems of the present invention may suitably be prepared by impregnation of the polymerisation catalyst and cocatalyst onto the pretreated porous support.

For example the pretreated support is preferably treated with the cocatalyst followed by treatment with the polymerisation catalyst The preferred polymerisation catalysts of the present invention are metallocene complexes.

Thus according to a preferred aspect of the present invention there is provided a supported polymerisation catalyst system comprising
(a) a metallocene complex,
(b) a cocatalyst and
(c) a porous support,
characterised in that the porous support has been pretreated with (i) a chemical dehydration agent and (ii) a hydroxy compound.

Thus according to another aspect of the present invention there is provided a method for the preparation of a supported polymerisation catalyst system comprising the following steps:
(i) pretreating a porous support with (i) a chemical dehydration agent and (ii) a hydroxy compound,
(ii) addition of a cocatalyst, and
(iii) addition of a polymerisation catalyst The supported polymerisation catalyst system of the present invention may also comprise polymerisable monomers. Our earlier applications WO 04/020487 and WO 05/019275 describe supported catalyst compositions wherein a polymerisable monomer is used in the catalyst preparation.

Thus according to another aspect of the present invention there is provided a supported polymerisation catalyst system comprising
(d) a metallocene complex,
(e) a cocatalyst,
(f) a porous support, and
(g) a polymerisable monomer
characterised in that the porous support has been pretreated with (i) a chemical dehydration agent and (ii) a hydroxy compound Polymerisable monomers suitable for use in this aspect of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene.

Alternatively a combination of one or more monomers may be used for example ethylene/1-hexene.

The preferred polymerisable monomer for use in the present invention is 1-hexene.

The polymerisable monomer is suitably used in liquid form or alternatively may be used in a suitable solvent. Suitable solvents include for example heptane.

The polymerisable monomer may be added to the cocatalyst before addition of the metallocene complex or alternatively may be premixed with the metallocene complex.

The supported catalyst systems of the present invention are most suitable for operation in processes which typically employ supported polymerisation catalysts.

The supported catalysts of the present invention may be suitable for the polymerisation of olefin monomers selected from (a) ethylene, (b) propylene (c) mixtures of ethylene and propylene and (d) mixtures of (a), (b) or (c) with one or more other α-olefins.

Thus according to another aspect of the present invention there is provided a process for the polymerisation of olefin monomers selected from (a) ethylene, (b) propylene (c) mixtures of ethylene and propylene and (d) mixtures of (a), (b) or (c) with one or more other α-olefins, said process performed in the presence of a supported polymerisation catalyst system as hereinbefore described.

The supported systems of the present invention are however most suitable for use in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

Thus according to another aspect of the present invention there is provided a process for the polymerisation of ethylene or the copolymerisation of ethylene and α-olefins having from 3 to 10 carbon atoms, said process performed under polymerisation conditions in the present of a supported catalyst system as hereinbefore described.

The preferred α-olefins are 1-butene, 1-hexene, 4-methyl-1-pentene and 1-octene.

Most preferred α-olefin is 1-hexene.

The supported catalysts prepared according to the present invention may also be suitable for the preparation of other polymers for example polypropylene, polystyrene, etc.

The method of the present invention has the advantage of providing a one-pot preparation and producing a good catalyst activity.

The present invention will now be illustrated with reference to the accompanying examples:

ABBREVIATIONS

TEA triethylaluminium
Ionic Compound A [N(H)Me($C_{18-22}H_{37-45}$)$_2$][B($C_6F_5$)$_3$(p-OH$C_6H_4$)]
Complex A ($C_5Me_4SiMe_2N^TBu$)Ti($\eta^4$-1,3-pentadiene)

EXAMPLE 1

To 2.7 g of silica D948 (previously calacined at 250° C. for 5 h under nitrogen) were slowly added 4.36 ml of an hexano solution of TEA (1 mol/l). The mixture was agitated for 30 minutes before addition 0.025 ml (0.437 mmol) of anhydrous ethanol. The mixture was well agitated and allowed to react for 30 minutes.

To 2.4 ml (0.176 mmol) of a 9.58% solution of Ionic Compound A in toluene was added 0.176 ml of an hexane solution of TEA (1 mol/l). The mixture was allowed to react for 15 minutes and then was added to the above prepared silica/TEA. The mixture was well agitated until non lumps were visible and was allowed to stand for 30 min.

To 1.0 ml (0.168 mmol) of a 8.63% solution of Complex A in heptane was added 0.735 ml of pure 1-hexene and the mixture was then added to the silica/TEA/borate mixture prepared above.

The mixture was well agitated for 30 minutes to allow a good dispersion and was finally dried under vacuum to yield a green free flowing powder.

EXAMPLE 2

To 2.7 g of silica D948 (previously calacined at 250° C. for 5 h under nitrogen) were slowly added 4.36 ml of an hexane solution of TEA (1 mol/l). The mixture was agitated for 30 minutes before addition 0.087 ml (0.437 mmol) of anhydrous 10-undecenen-1-ol. The mixture was well agitated and allowed to react for 30 minutes.

To 2.4 ml (0.176 mmol) of a 9.58% solution of Ionic Compound A m toluene was added C. 176 ml of an hexane solution of TEA (1 mol/l). The mixture was allowed to react for 15 minutes and then was added to the above prepared silica/TEA. The mixture was well agitated until non lumps were visible and was allowed to stand for 30 min.

To 1.0 ml (0.168 mmol) of a 8.63% solution of Complex A in heptane was added 0.735 ml of pure 1-hexene and the mixture was then added to the silica/TEA/borate mixture prepared above.

The mixture was well agitated for 30 minutes to allow a good dispersion and was finally dried under vacuum to yield a green free flowing powder.

EXAMPLE 3

Polymerisation Runs

This catalysts were tested for ethylene-1-hexene copolymerisation in an agitated dried phase reactor under the following conditions:

A 2.5 l double jacketed thermostatic stainless steel autoclave was purged with nitrogen at 70° C. for at least one hour. 70 g of NaCl was used as the seed bed. 0.15 g of TEA treated silica (1.5 mmol TEA/g) was added under pressure and allowed to scavenge impurities for at least 15 minutes under agitation. The gas phase was then composed (addition of ethylene, 1-hexene and hydrogen) and a mixture of supported catalyst (see below) and silica/TEA (~0.1 g) was injected. A constant pressure of ethylene and a constant pressure ratio of ethylene/co-monomer were maintained during the run. The run was terminated by venting the reactor and then purging the reactor 3 times with nitrogen. The PE powder produced during the run was then separated from the seed bed by simple sieving.

Typical conditions are as follows:
  seed bed: dried NaCl (70 g)
  scavenger: TEA treated silica (0.15 g)
  PC2: 10 b
  C6/C2(% vol)=0.3
  H2/C2 (% vol)=0.2
  T°=80° C.
  run length: 80 minutes At the end of the run the reactor content was washed several times with water to eliminate the salt bed and the obtained polymer was finally dried at 45° C. overnight.

The polymerisation results are summarised in the following table showing the activity of the inventive supported catalyst systems.:

| Catalyst | Catalyst injected mg | Molar ratio OH/TEA | Prod g | Yield g/g | Tm ° C. | Mn | Mw | Mw/Mn |
|---|---|---|---|---|---|---|---|---|
| Ex. 1 | 11.7 | 0.1 | 5.7 | 487 | 114.9 | 50960 | 141370 | 2.77 |
| Ex. 2 | 9.4 | 0.1 | 7.7 | 820 | 110.9 | 48200 | 127930 | 2.65 |

The MW/Mn determination was performed as follows:
  Device: Polymer Laboratories GPC Model 220
  Separation Column: PL-rapid H 150 mm×7.5 mm (Polystyrene/Divinylbenzene co-polymer)
  Solvent: Trichlorobenzene stabilised with 1 g/L BHT 1 ml/min
  Calibration: Use of 10 polystyrene standards (7500000-580 Da).
  Sample preparation: to 10 ml of solvent are added ±5 mg of polymer, solubilisation for 2 hours at 160° C. under agitation and inert atmosphere (N2)
  Analyse: Injection of 50 µl solution and run time of 6 min at 160° C.

The invention claimed is:

1. A method for the preparation of a supported polymerisation catalyst system comprising the following steps:
   (a) pretreating a porous support with (i) a chemical dehydration agent and (ii) a hydroxy compound to form a pretreated support,
   (b) adding a cocatalyst to the pretreated support, and
   (c) adding a metallocene polymerisation catalyst to the pretreated support, and
   adding a polymerisable monomer to the cocatalyst prior to adding the metallocene polymerization catalyst or concurrently with adding the metallocene polymerization catalyst.

2. A method for the preparation of a supported polymerisation catalyst system according to claim 1, wherein the supported polymerisation catalyst system has a molar ratio of hydroxy compound to chemical dehydration agent of <2.

3. A method for the preparation of a supported polymerisation catalyst system according to claim 1, wherein the supported polymerisation catalyst system has a molar ratio of hydroxy compound to chemical dehydration agent in the range of 0.0001 to 0.2.

4. A method for the preparation of a supported polymerisation catalyst system according to claim 1, wherein the porous support is silica.

5. A method for the preparation of a supported polymerisation catalyst system according to claim 1, wherein the chemical dehydration agent is an organoaluminium compound.

6. A method for the preparation of a supported polymerisation catalyst system according to claim 5, wherein the organoaluminium compound is a trialkylaluminium compound.

7. A method for the preparation of a supported polymerisation catalyst system according to claim 1, wherein the metallocene polymerisation catalyst has the general formula:

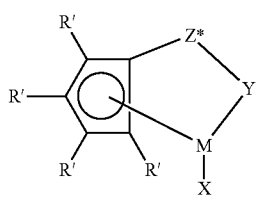

wherein:
R' each occurrence is independently selected from hydrogen, hydrocarbyl, silyl, germyl, halo, cyano, or combinations thereof, said R having up to 20 nonhydrogen atoms, and optionally, two $R^1$ groups (where $R^1$ is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;
Y is —O—, —S—, —NR*—, —PR*—,
M is titanium or zirconium in the +2 formal oxidation state;
Z* is $SiR^*_2$, $CR^*_2$, $SiR_2SiR^*_2$, $CR^*_2CR^*_2$, $CR^*=CR^*$, $CR^*_2SiR^*_2$, or
GeR* 2, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

8. A method for the preparation of a supported polymerisation catalyst system according to claim 7, wherein M is titanium.

9. A method for the preparation of a supported polymerisation catalyst system according to claim 1, wherein the cocatalyst is an aluminoxane, a borane or a borate.

10. A method for the preparation of a supported polymerisation catalyst system according to claim 1, wherein the cocatalyst has the formula:

$$(L^*\text{-}H)^+_d(A^{d-})$$

wherein
L* is a neutral Lewis base
$(L^*\text{-}H)^+d$ is a Bronsted acid
$A^{d-}$ is a non-coordinating compatible anion having a charge of $d^-$, and d is an integer from 1 to 3.

11. A method for the preparation of a supported polymerisation catalyst system according to claim 1, wherein the cocatalyst comprises ionic compounds having a cation and an anion wherein the anion has at least one substituent comprising a moiety having an active hydrogen.

12. A method for the preparation of a supported polymerisation catalyst system according to claim 1, wherein the polymerisable monomer is 1-hexene.

13. A process for the polymerisation of olefin monomers selected from (a) ethylene, (b) propylene, (c) mixtures of ethylene and propylene or (d) mixtures of (a), (b) or (c) with one or more other α-olefins, said process comprising polymerizing the olefin monomers in the presence of a supported polymerisation catalyst system prepared according to the method of claim 1.

14. A process according to claim 13 wherein the α-olefin is 1-hexene.

15. A process according to claim 13, wherein the process is performed in the gas phase.

16. A process comprising polymerising ethylene or copolymerising ethylene and α-olefins having from 3 to 10 carbon atoms, under polymerisation conditions in the presence of a supported polymerisation catalyst system prepared according to method of claim 1.

* * * * *